United States Patent
Usuba et al.

(10) Patent No.: US 7,184,661 B1
(45) Date of Patent: Feb. 27, 2007

(54) TRANSMISSION EQUIPMENT FOR NETWORK AND NETWORK TRANSMISSION SYSTEM

(75) Inventors: Keiji Usuba, Yokohama (JP); Yoshimi Nakagawa, Yokohama (JP); Satoko Araki, Yokohama (JP); Yusuke Yajima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 305 days.

(21) Appl. No.: 09/589,526

(22) Filed: Jun. 7, 2000

(30) Foreign Application Priority Data

Feb. 9, 2000 (JP) .......................... P2000-038037

(51) Int. Cl.
*H04J 14/00* (2006.01)
*H04B 10/00* (2006.01)

(52) U.S. Cl. ........................... 398/46; 398/47; 398/54; 398/3

(58) Field of Classification Search .................... 398/3, 398/4, 11, 18, 83, 46, 47, 53, 54; 370/217, 370/223, 224, 242, 245, 249
See application file for complete search history.

(56) References Cited

U.S. PATENT DOCUMENTS

| | | | | |
|---|---|---|---|---|
| 5,406,401 A | * | 4/1995 | Kremer | 398/4 |
| 5,663,820 A | * | 9/1997 | Shiragaki | 398/50 |
| 5,737,310 A | * | 4/1998 | Goto | 370/222 |
| 5,864,414 A | * | 1/1999 | Barnsley et al. | 398/71 |
| 5,933,258 A | * | 8/1999 | Flanagan et al. | 398/5 |
| 6,088,141 A | * | 7/2000 | Merli et al. | 398/5 |
| 6,125,104 A | * | 9/2000 | Shiragaki et al. | 370/216 |
| 6,222,653 B1 | * | 4/2001 | Asahi | 398/4 |
| 6,272,154 B1 | * | 8/2001 | Bala et al. | 370/535 |
| 6,456,587 B2 | * | 9/2002 | Taniguchi | 370/216 |

OTHER PUBLICATIONS

*Sonet BLSR Equipment Generic Criteria, Overview of the BLSR Architecture, GR-1230-Core*, Issue 3, pp. 3-1 thru 3-24, 6-3, 6-13, 6-14, and 6-24, (1996).

\* cited by examiner

*Primary Examiner*—Dalzid Singh
(74) *Attorney, Agent, or Firm*—Townsend and Townsend and Crew LLP

(57) ABSTRACT

According to the invention, in a transmission apparatus, there are provided an equipment supervision unit detecting an obstacle in the equipment and a switching control unit controlling the switching operation of transmission lines. When the equipment supervision unit detects condition in which obstacles have occurred in more than one groups of the cross connect unit or the clock unit in which paths provided are disconnected, the same K-bytes as in the case when SF failure is detected are outputted to all the fibers to be inputted to the equipment. Alternatively, an FS-R command is executed to both sides, or Line-AIS is inserted in all the outputted transmission lines, or an output is disconnected, so that the equipment is isolated and the paths provided through a node is relieved.

10 Claims, 13 Drawing Sheets

FIG.5

| No. | OUTPUT K - byte |
|---|---|
| PATTERN 1 | a=K1 : [SF - R/A]  K2 : [B/S/idle]<br>b=K1 : [SF - R/C]  K2 : [B/S/idle] |
| PATTERN 2 | a=K1 : [FS - R/A]  K2 : [B/S/idle]<br>b=K1 : [FS - R/C]  K2 : [B/S/idle] |
| PATTERN 3 | a=K1 : [******]  K2 : [*111]<br>b=K1 : [****]  K2 : [***111] |

TRANSMISSION EQUIPMENT FOR NETWORK AND NETWORK TRANSMISSION SYSTEM

CROSS-REFERENCES TO RELATED APPLICATIONS

This application claims priority from Japanese Patent Application Reference No. P2000-038037, filed Feb. 9, 2000.

BACKGROUND OF THE INVENTION

The present invention relates generally to optical transmission networks and specifically to fault tolerance and recovery in Bi-directional Line Switched Ring (BLSR) types of Synchronous Optical Networks (SONET) employing Synchronous Digital Hierarchy (SDH).

Conventionally, BLSR networks can be one of either a 2-fiber BLSR or a 4-fiber BLSR types of SONET networks. The 2-fiber BLSR networks comprise a plurality of network equipment ("nodes") interconnected by two optical fibers. On the other hand, in a 4-fiber BLSR network, nodes are interconnected by four optical fibers that provide a "working line" and a "protection line."

Equipment faults and the like can cause obstacles to occur in a transmission. Such obstacles can block the path through the transmission line. One perceived drawback of conventional systems is that they do not presently provide remedies for obstacles and the like that can arise inside the node, which can sometimes disconnect a path through the node.

What is really needed are techniques for isolating a network node automatically in order to circumnavigate an obstacle occurring inside the node.

SUMMARY OF THE INVENTION

According to the present invention, techniques for automatically isolating a node having an internal fault in order to relieve a path provided there through are provided. Embodiments can include systems, apparatus and methods that provide such isolation. Switching controls can be activated in response to obstacles present in nodes and transmission lines, in specific embodiments. The switching controls can reroute traffic in order to avoid the obstacle. Specific embodiments can detect network conditions such as a no-main-signal condition, for example, and can activate node isolation at the time a network is structured, for example.

In a representative embodiment according to the present invention, a transmission apparatus for use in a communication network is provided. The network can comprise a plurality of transmission equipment connected through a plurality of transmission lines that transmit synchronous multiplex signals, for example. An overhead for supervision, maintenance and operations of transmission equipment and transmission lines is added to a payload in which main signals are multiplexed within the apparatus. The transmission apparatus comprises an optical transmitter that transmits synchronous multiplex signals to the transmission lines, and an optical receiver that receives the synchronous multiplex signals from the transmission lines. Further, the apparatus can comprise an overhead processing unit that adds the overhead to the payload and extracts the overhead out of the synchronous multiplex signals from the optical receiver. A cross connect unit that divides and multiplexes the payload inputted from the overhead processing unit, switches output routes of the payload for transmission to either of the transmission lines, and outputs to the overhead processing unit again, can also be part of the apparatus. Further, a clock unit that supplies a clock to at least the cross connect unit and an equipment supervision unit that supervises at least the cross connect unit and the clock unit and outputs an instruction signal based upon the result of the supervision can also comprise the apparatus. A switching control unit that controls switching of the transmission lines so that, based upon the instruction signal and the overhead, the cross connect unit, the overhead processing unit and the optical transmitter, the synchronous multiplex signals may be transmitted to either of the transmission lines properly. In the apparatus, upon the equipment supervising unit detecting a condition in which obstacles have occurred in more than one group in at least either of the cross connect unit and the clock unit, the equipment supervision unit inserts information about the obstacles in the instruction signal, and the switching control unit into which the instruction signal is inputted enables the overhead processing unit and the optical transmitter to output isolation instruction information to the transmission line.

In another representative embodiment according to the present invention, when an obstacle occurs in equipment and a path through a node of interest cannot be relieved, the node of interest can be transferred into an isolated condition.

In a yet further representative embodiment according to the present invention, a method for recovering from a plurality of substantially contemporaneous faults in a network node is provided. The method can be operable in a network node capable of transmitting information as synchronous multiplex signals via a plurality of transmission lines, for example. The method can include a variety of steps, including a step of preparing isolation information into an instruction signal according to the plurality of substantially contemporaneous faults. A step of providing the isolation information to at least one of a plurality of adjacent network nodes can also be part of the method. Additionally, the method can include a step of switching transmission lines based upon the instruction signal so that the synchronous multiplex signals may be transmitted to either of the transmission lines properly.

Also, in specific embodiments according to the present invention, when the obstacle occurs in the equipment, the optical fiber transmission lines that provide input to the node can be regarded as being in an obstructed condition similar to having a signal obstacle condition. Alternatively, a ring switch can be forcefully activated at both ends of the node, causing the faulty node to be transferred into an isolated condition. In another alternative embodiment control information indicating that the transmission line is in an abnormal condition is inserted in the optical fiber transmission lines leading out from the faulty node. In a further embodiment, optical output is disconnected and the faulty node is transferred into an isolated condition.

Numerous benefits are achieved by way of the present invention over conventional techniques. The present invention can provide a path through a network having a faulty node, such that network constraints can be relieved by an automatic switching function of the BLSR network. In some specific embodiments, even when a path provided through a node cannot be relieved, due to an obstacle occurring in a cross connection unit or a clock unit in a BLSR network, for example, the node isolation can be activated, and as a result, in such embodiments, the path provided through the node can be relieved.

These and other benefits are described throughout the present specification. A further understanding of the nature

BRIEF DESCRIPTION OF THE DRAWINGS

FIG. 5 shows a relationship between a K-byte and a pattern;

DESCRIPTION OF THE SPECIFIC EMBODIMENTS

Figure 1:
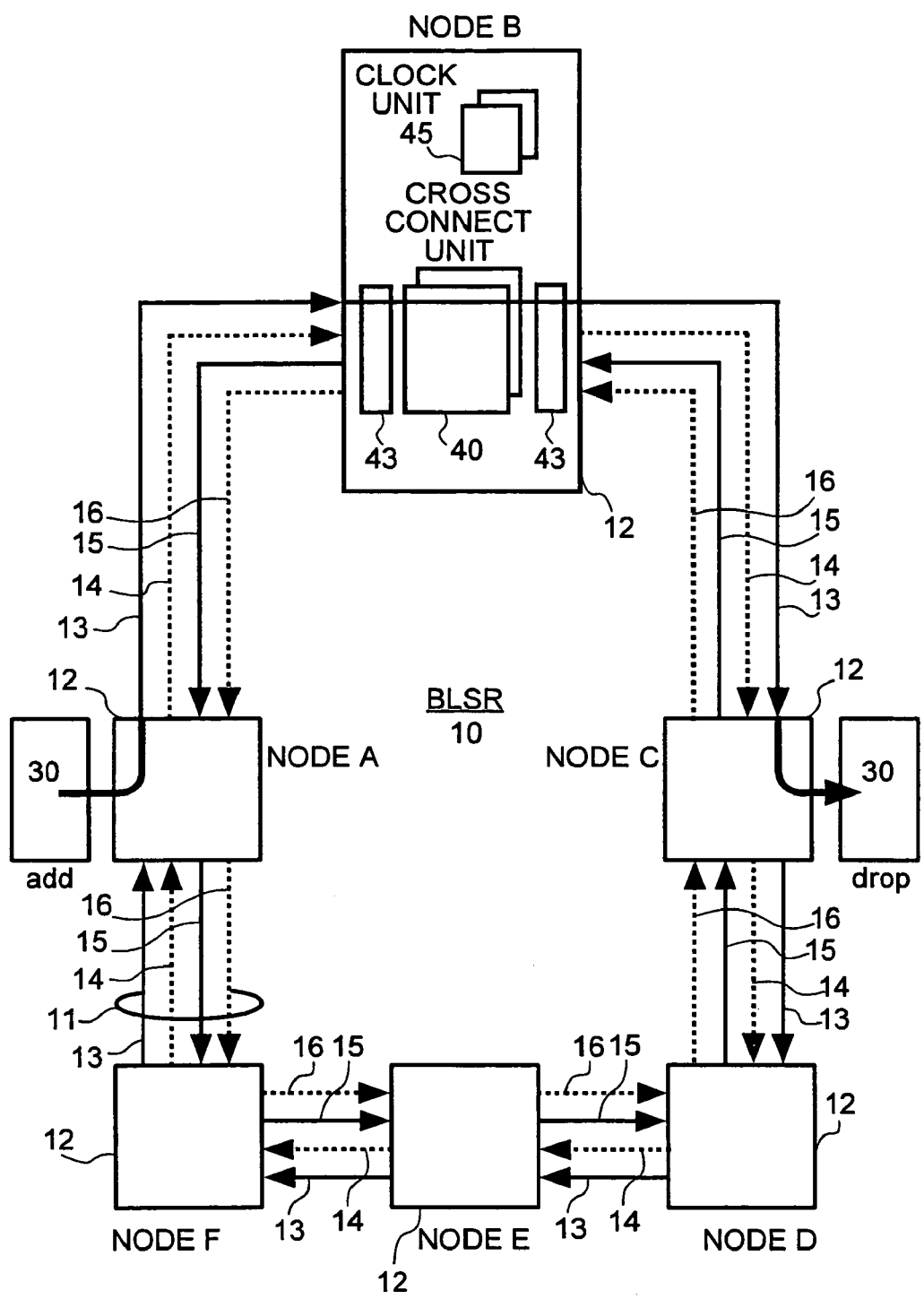
FIG. 1 shows a diagram of a representative structure of a BLSR network.

The present invention provides techniques for rerouting traffic around nodes in which obstacles have occurred in more than one group in the network.

The present invention will be best understood having reviewed the fundamentals underlying BLSR type SONET networks as described herein. There are presently a 2-fiber BLSR and a 4-fiber BLSR known as BLSR networks of SONET. In 2-fiber BLSR networks, equipment is interconnected by two optical fibers, and the capacity of each line is divided into two, one half of the capacity being used for the working system, the remaining half thereof for the protection system. By contrast, in the 4-fiber BLSR, a "working line" and a "protection line," are provided, thus the nodes are interconnected by four optical fibers. In such ring networks, data is transferred by frame called Synchronous Transport Signal-Level 1 (STS-1), for example. These frames are time division multiplexed and transmitted to the predetermined time slots.

The frame comprises a synchronous multiplex signal to be transmitted or multiplexed and divided. Frames are created by adding a signal, called an "overhead," for supervision, maintenance and operations of transmission equipment and the communication network to a digitized and multiplexed main signal, called a "payload."

In both the 2-fiber BLSR and the 4-fiber BLSR networks, a "working line" is one that can be used for transmission, and a "protection line" is one used to relieve traffic when obstacles occur. The network traffic flows around what is called a "path." A representative example, in the case of a 4-fiber BLSR OC-48 (Optical Carrier) network, will be described by the following.

The 4-fiber BLSR, in which a plurality of nodes are interconnected by lines in a ring shape, comprises four bi-directional optical fibers, two for nodes on an adjacent side and the other two for nodes on the other adjacent side. These optical fibers comprise a working line in the clockwise (CW) direction, a protection line in the CW direction, a working line in the counterclockwise (CCW) direction and a protection line in the CCW direction. Each node can accommodate a lower level network element, and can add or drop an STS-1 path of each line between the lower level network element and the optional fiber transmission lines. Such nodes are referred to as an add/drop multiplexer (ADM).

As an example, when an obstacle occurs on a CW working line alone between two particular nodes, a path through the faulty section is provided by transmitting the traffic using a CW protection line. This switching operation from the CW working line to the CW protection line is called a "span switch".

As another example, when obstacles occur on both the CW working line and the CW protection line between two particular nodes, a path through the faulty sections can be provided by looping back to a CCW protection line in the reverse direction. In other words, of the nodes at both ends of the faulty optical fiber transmission line, one node loops the path back through the CCW protection line in the reverse direction, and the other node drops the path from the CCW protection line. Nodes other than the nodes of interest at the ends are placed into a condition of letting the path go through using the CCW protection line (hereafter also called the "Full Pass Through" state). This switching operation is called a "Ring Switch".

Thus nodes at the faulty ends (at the both ends of the faulty optical fiber transmission line) execute the span switch or the ring switch.

Further, as another example, when obstacles occur in four fibers that provide input to a given node, the node is placed into a "node isolation" condition, in which the node is isolated, and a node adjacent to the isolated node executes the ring switch. In this case, one of the adjacent nodes sets a path using the CW working line loop, and switches the transmission to the reverse direction by using the CCW protection line. Also, the other adjacent node drops a path using the CCW protection line.

Such switching controls are executed by a K-byte, which is switching control information, called the "overhead," for supervision, maintenance and operations. Further, in 4-fiber BLSR networks, the switching control is executed by K-bytes that can be extracted from the protection line. The switching control is activated by obstacles on transmission lines. Examples of such obstacles include a no-main-signal condition (Loss of Signal; also called "LOS"), an out-of-frame synchronization condition (Loss of Frame; also called "LOF") and a faulty transmission line condition (Line Alarm Indication Signal; also called "Line AIS"). Further, Loss of Signal, Loss of Frame and Line Alarm Indication Signal are called signal failure conditions (Signal Failure; hereafter called "SF").

When an obstacle occurs inside a node, or even when protected by a duplex system, i.e., in the case when both the node components for the working line ("working system") and the node components for the protection line ("protection system") have obstacles, not only are paths branched and dropped, but also a path provided through the node is disconnected.

Conventional switching controls are activated by obstacles on transmission lines and but not activated by obstacles inside the node. However, due to obstacles and so on inside the node, a path provided through the node may sometimes be disconnected. Responsive to such conditions, specific embodiments according to the present invention provide techniques for isolating a node having such faults and providing a path that circumvents the node. Representative embodiments according to the present invention will now be described with reference to FIGS. 1 through 13.

FIG. 1 shows a representative example BLSR network 10 that illustrates how transmission lines can be used in a particular embodiment according to the present invention. The BLSR network 10 comprises optical fiber transmission lines 11 and a plurality of nodes 12. FIG. 1 shows the BLSR network 10 comprising 6 nodes (node A, node B, node C, node D, node E and node F). It also shows that a path is added at A using the working line 13 in the CW direction and dropped at C through B.

Figure 2:
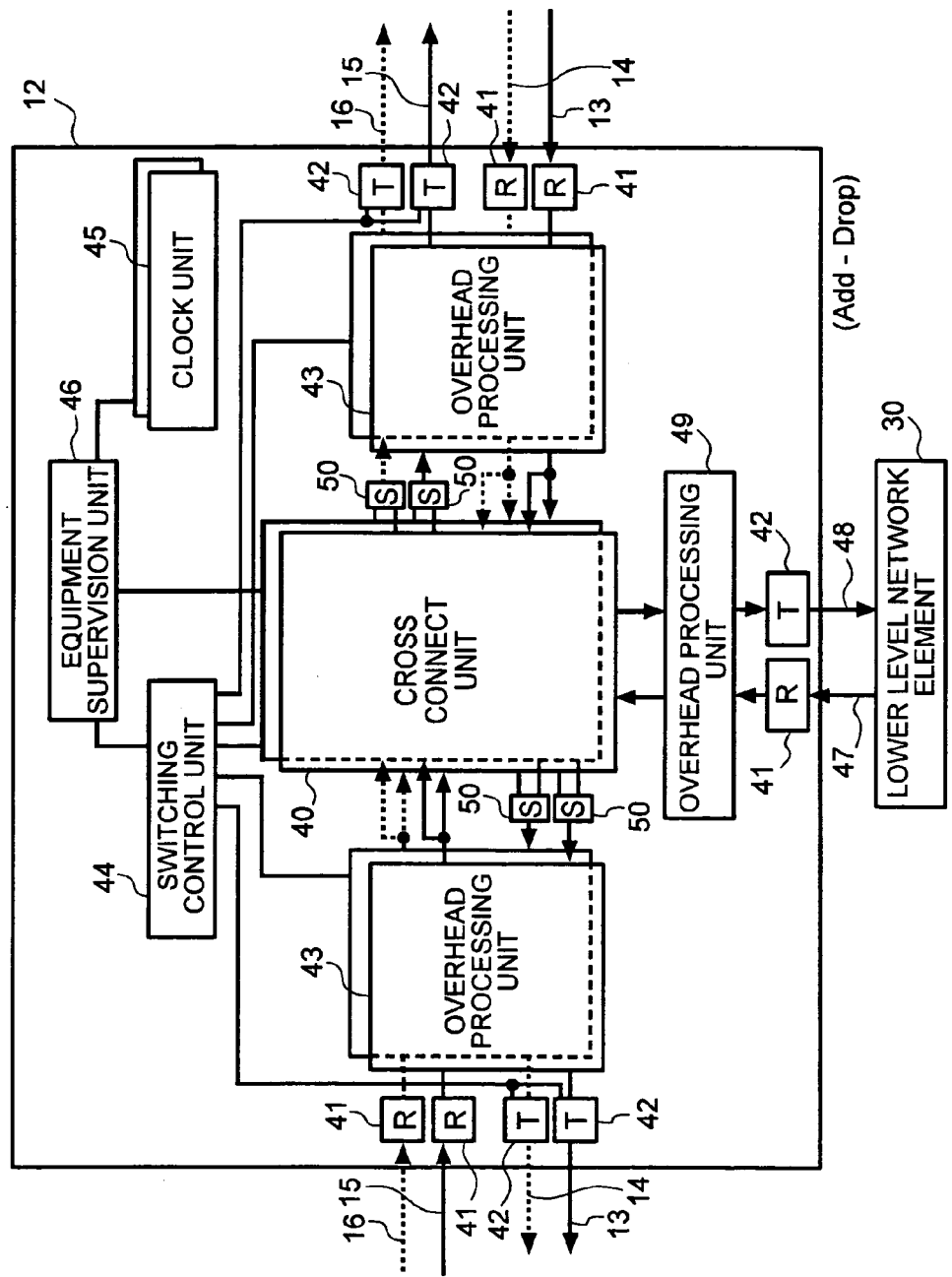
FIG. 2 shows a diagram of a representative structure of a node.

FIG. 2 shows representative node 12 in a particular embodiment according to the present invention. Since nodes in BLSR network 10 all have similar structures, an example node is shown in FIG. 2 as representative of such nodes.

In FIG. 2, the node 12 is an Add-Drop Multiplexer (ADM) node that accommodates a working line 13 in the CW direction, a protection line 14 in the CW direction, a working line 15 in the CCW direction and a protection line 16 in the CCW direction, as well as an Add line 47 (a line for adding a path from low level equipment 30) and a Drop line 48 (a line for dropping a path and outputting it to the low level equipment 30).

Optical signal input is received from an adjacent node by an optical receiver (R) 41, and then provided as input to each part of a duplex overhead processing unit 43 for overhead processing. Paths whose overheads are removed are then provided as input to a cross connect unit 40 that performs a Time Slot Interchange (TSI) and a Time Slot Assignment (TSA) of respective paths on the high-speed side and the low-speed side, and are delivered in respective directions by STS-1. In this case, the paths that are input to the duplex cross connect unit 40 are the same ones. Delivered paths are each multiplexed, overheads thereof being processed by the overhead processing unit 43, converted into optical signals by an optical transmitter (T) 42 and then provided as output from any one of the working lines 13 in the CW direction, the protection lines 14 in the CW direction, the working lines 15 in the CCW direction, the protection lines 16 in the CCW direction and the Drop line 48. Further, between the duplex cross connect unit 40 and the overhead processing unit 43, there is a selector 50 that selects a path according to an instruction of an equipment supervision unit 46 that supervises obstacles in the equipment. This relation between the equipment supervision unit 46 and the selector 50 is not shown in FIG. 2, however.

Further, according to conditions of the transmission line (broken optical fiber, and the like) and instructions from the Operation System (OpS), which serves as a control unit of the whole system, executions of the ring switch and the span switch are determined, and a switching order is given to the cross connect unit 40. Upon reception of the switching order from a switch control unit 44, the cross connect unit 40 switches paths according to conditions (such as the Ring Switch, the Span Switch and the Full Pass Through). Further, the switching control unit 44 collects K-bytes to be provided as input from the overhead processing unit 43, controls K-bytes to be provided as output at the overhead processing unit 43. Also, the switching control unit 44 controls the optical transmitter (T) 42, and has a function to stop the output of optical signals. The equipment supervision unit 46 supervises obstacle handling for the node. Upon detecting an obstacle, equipment supervision unit 46 outputs obstacle information in the form of an instruction signal to the switching control unit 44. A clock unit 45 provides each functional section in the node with a clock signal. The cross connect unit 40, the clock unit 45, and the like can be duplexed for improving reliability. The duplexed units are shown in the embodiment in FIG. 2.

Figure 3:
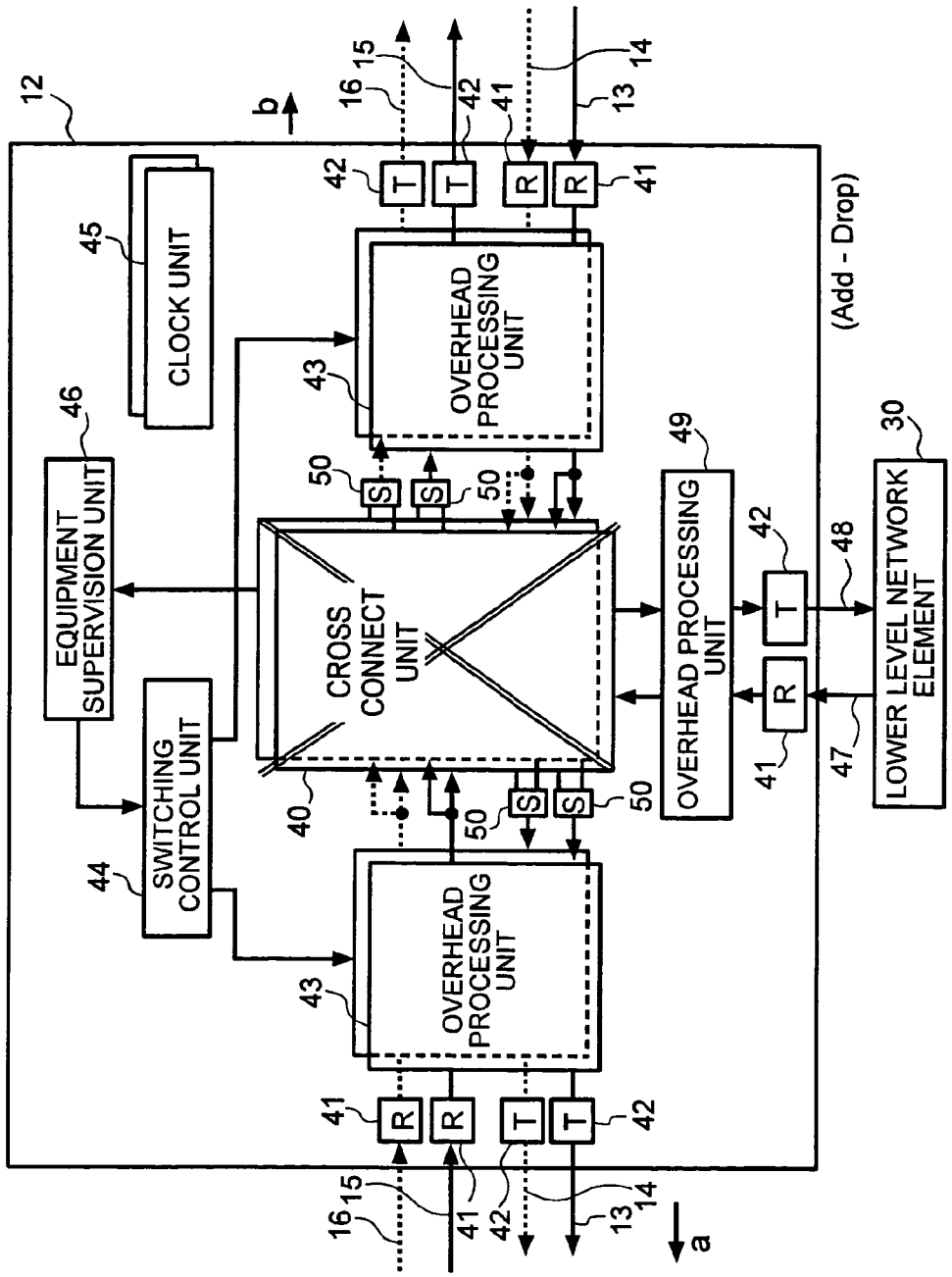
FIG. 3 shows a diagram of a representative node in which a cross connect unit in which obstacles have occurred in more than one group in a particular embodiment according to the present invention.

FIG. 3 shows a representative embodiment according to the present invention. In the representative embodiment illustrated by FIG. 3, obstacles exist in both the working system and the protection system of the cross connect unit 40, and paths provided through cross connect unit 40 are disconnected. For example, when an obstacle occurs in the cross connect unit 40 in the node B, as shown in FIG. 1, paths are disconnected as described above. In the example illustrated by FIG. 3, the equipment supervision unit 46, detects that obstacles have occurred in more than one group, i.e., the working system and the protection system, of the cross connect unit 40. Responsive to this obstacle condition, equipment supervision unit 46 disconnects paths provided through cross connect unit 40. In the event that a condition in which in which obstacles have occurred in more than one group is detected, the equipment supervision unit 46 outputs an instruction signal, in which the obstacle information is assigned to an information section unused by the instruction signal, to the switching control unit 44. Then, in order to isolate the equipment, the switch control unit 44, the overhead processing unit 43 and the optical transmitter 42 output isolation instruction information "a" and isolation instruction information "b" to an optical fiber transmission line for an adjacent node. Upon receiving the isolation instruction information, the adjacent node executes a ring switch so that the faulty node in question may be isolated. The details will be described in the following.

Figure 4:
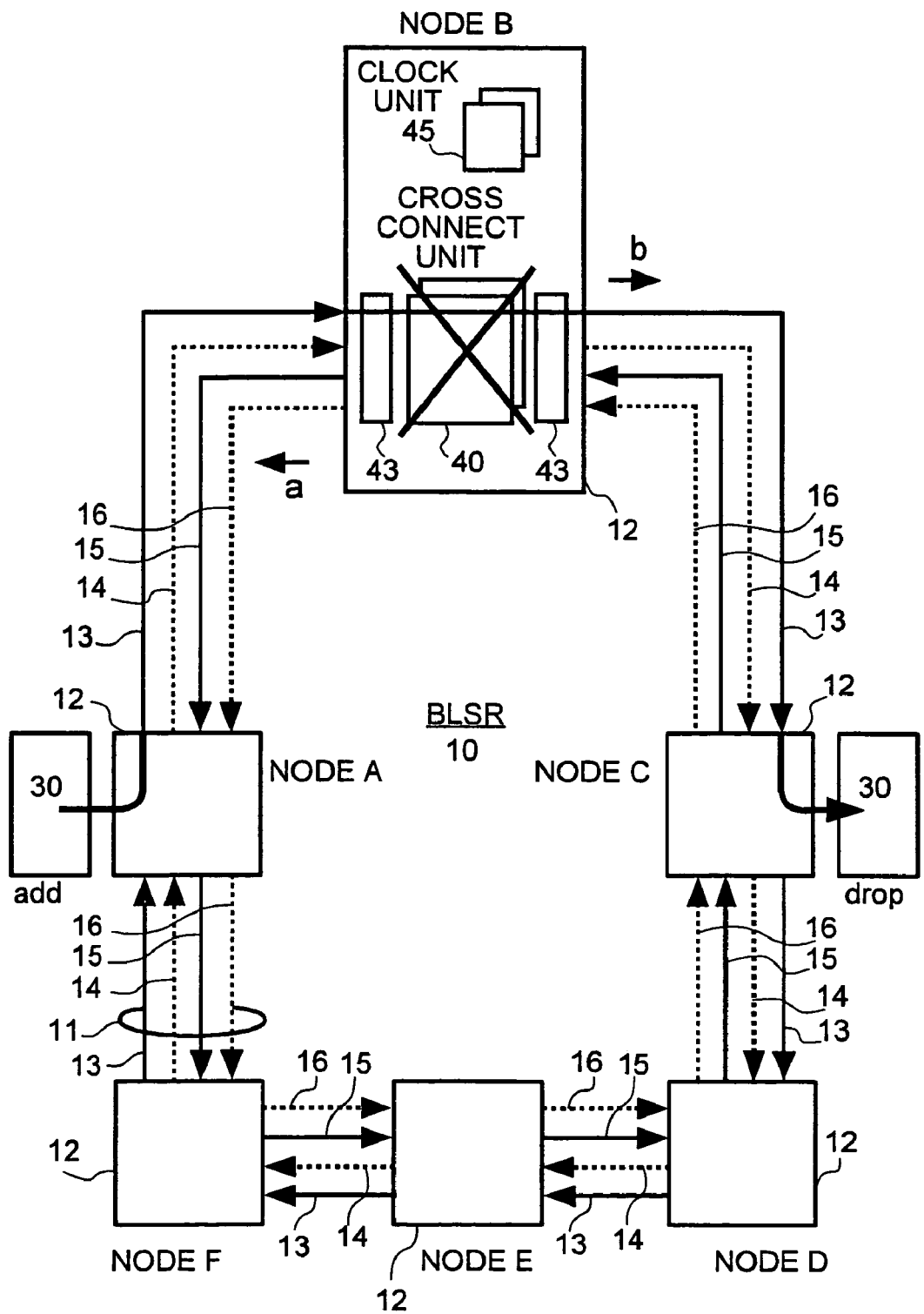
FIG. 4 shows a diagram of a representative BLSR network having a cross connect unit of node B in which obstacles have occurred in more than one group in a particular embodiment according to the present invention.

FIG. 4 illustrates a case in which the cross connect unit of FIG. 1 has obstacles in both the working system and the protection system. FIG. 4 shows that a K-byte comprising isolation instruction information "a" or isolation instruction information "b," is provided by the node B. The isolation instruction information "a" and the isolation instruction information "b" are K-bytes comprising the combination shown in FIG. 5, for example. Further, the isolation instruction information "a" and the isolation instruction information "b" may be the same information.

Pattern 1 in FIG. 5 shows K-bytes which are the same as the ones when signal failures (SF) occur in all four fibers to be inputted, namely, the working line 15, the working line 13, the protection line 16 and the protection line 14.

Pattern 2 in FIG. 5 shows K-bytes to be provided as output in the case of FS-R, in which a ring switch is forcefully executed on both sides of the node B.

Pattern 3 in FIG. 5 shows that signals of Line-AIS (K2 bits 6 to 8 are set to a value of "1") in the case of a faulty transmission line defined by GR-1230, which can be provided as output. When providing Line-AIS as output, any combination of the remaining bits of K1 and K2 is possible, and is indicated by "*" in FIG. 5. K-bytes of Pattern 1, Pattern 2 and Pattern 3 can be inserted in overheads of respective transmission lines by the overhead processing unit 43 of the node B.

Figure 6:
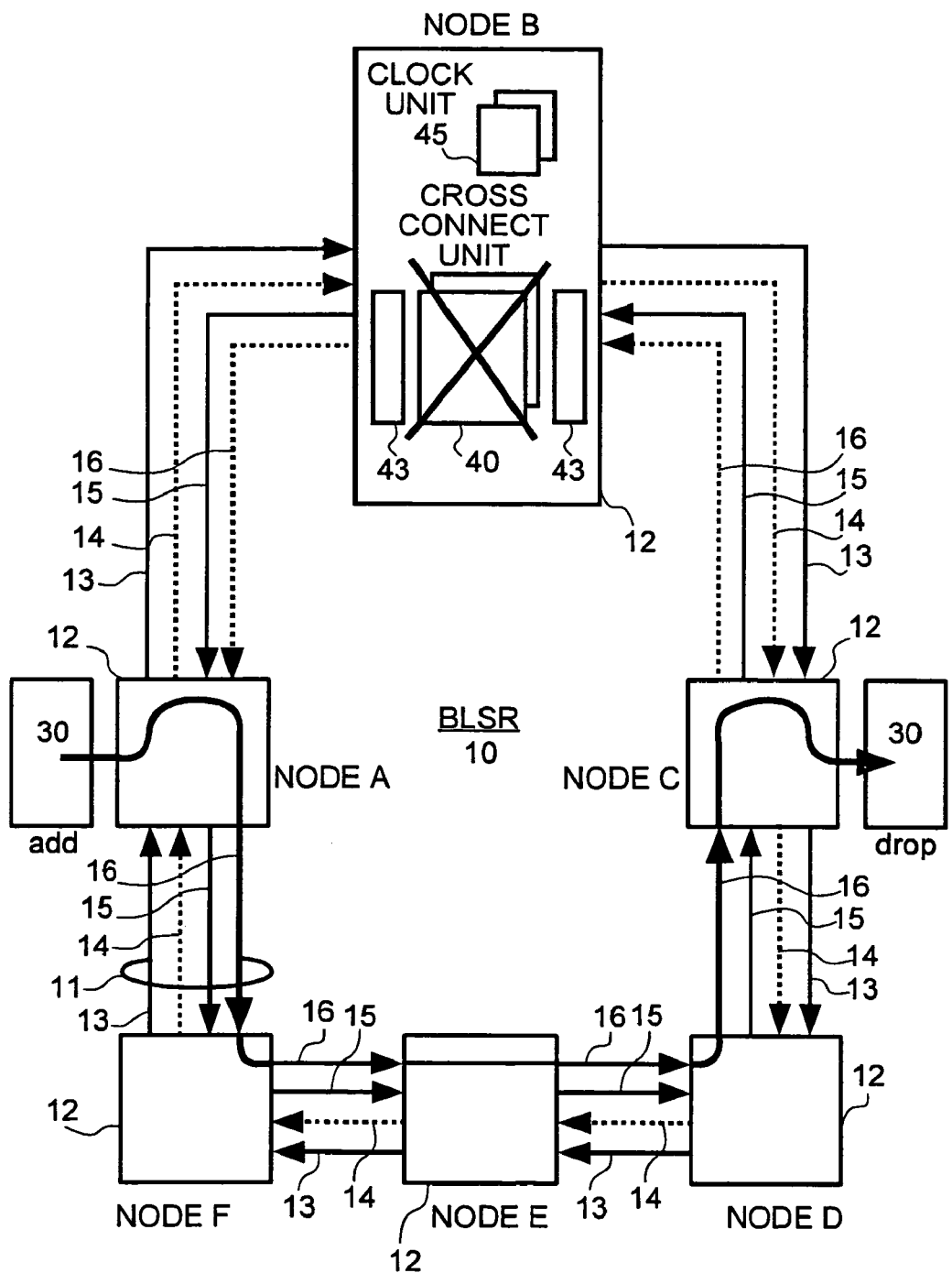
FIG. 6 shows a route in which a path is relieved in a particular embodiment according to the present invention.

FIG. 6 shows a representative BLSR network after the K-bytes illustrated by FIG. 5 are transmitted from the node B. In FIG. 6, the ring switches are executed in the node A and the node C, which have received K-bytes illustrated by FIG. 5. Normally, the paths set up as in FIG. 1 are protected by using the protection transmission line 16 through the node A, the node F, the node E, the node D and the node C, in this order. As a result, a path is protected even when the cross connect unit 40 of the node B, which is not supposed to be protected, suffers obstacles occurring in more than one group.

Figure 7:
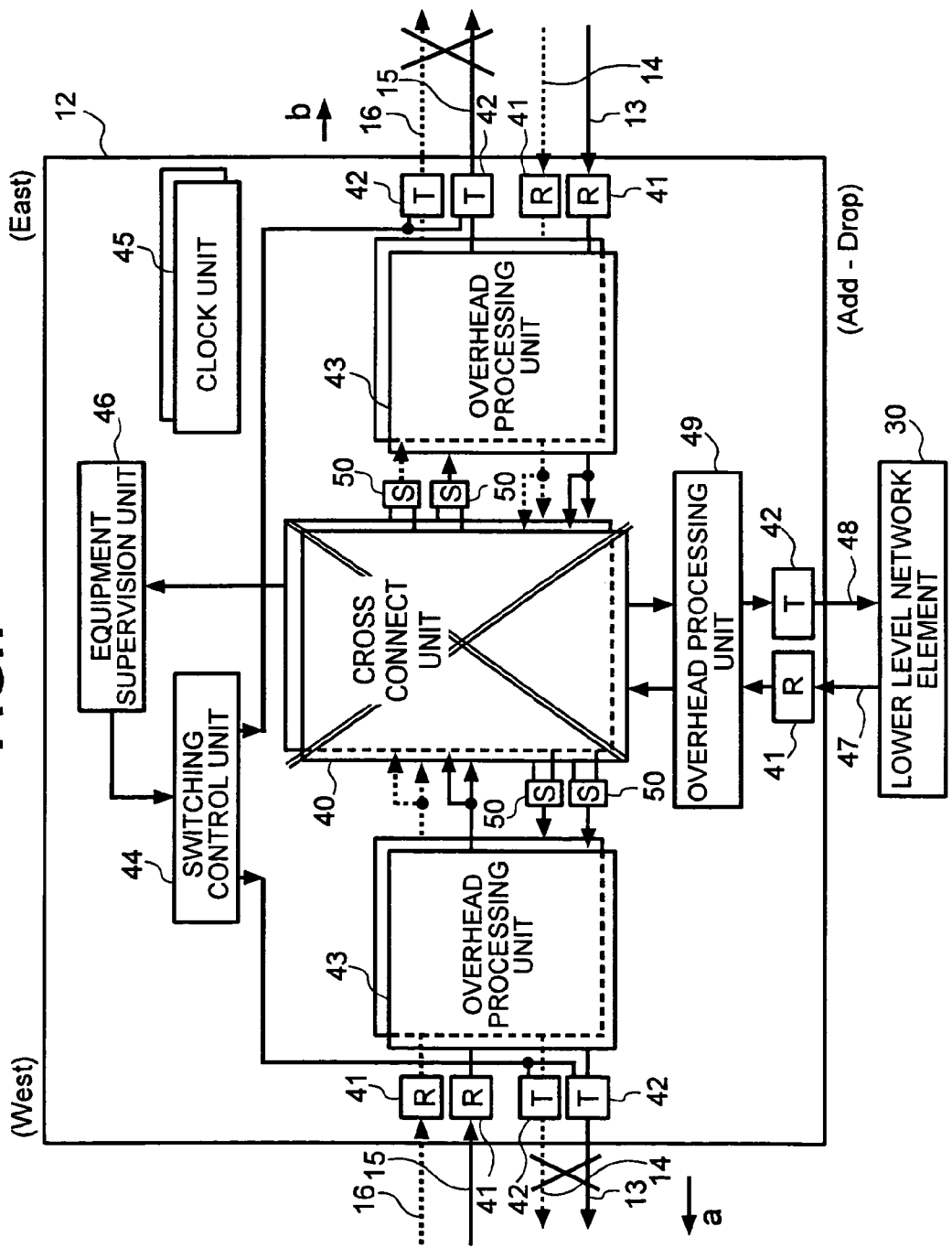
FIG. 7 shows a node disconnecting an output for a cross connect unit in which obstacles have occurred in more than one group in a particular embodiment according to the present invention.

FIG. 7 shows an example of node isolation, which is another equipment isolation condition of the present invention. According to the present invention, when a condition in which obstacles have occurred in more than one group of the cross connect unit 40 is detected, the switching control unit 44 disconnects the output of the optical transmitter (T) 42. Namely, the isolation instruction information "a" or the isolation instruction information "b" in this case means that there is no signal on the optical fiber transmission line.

Figure 8:
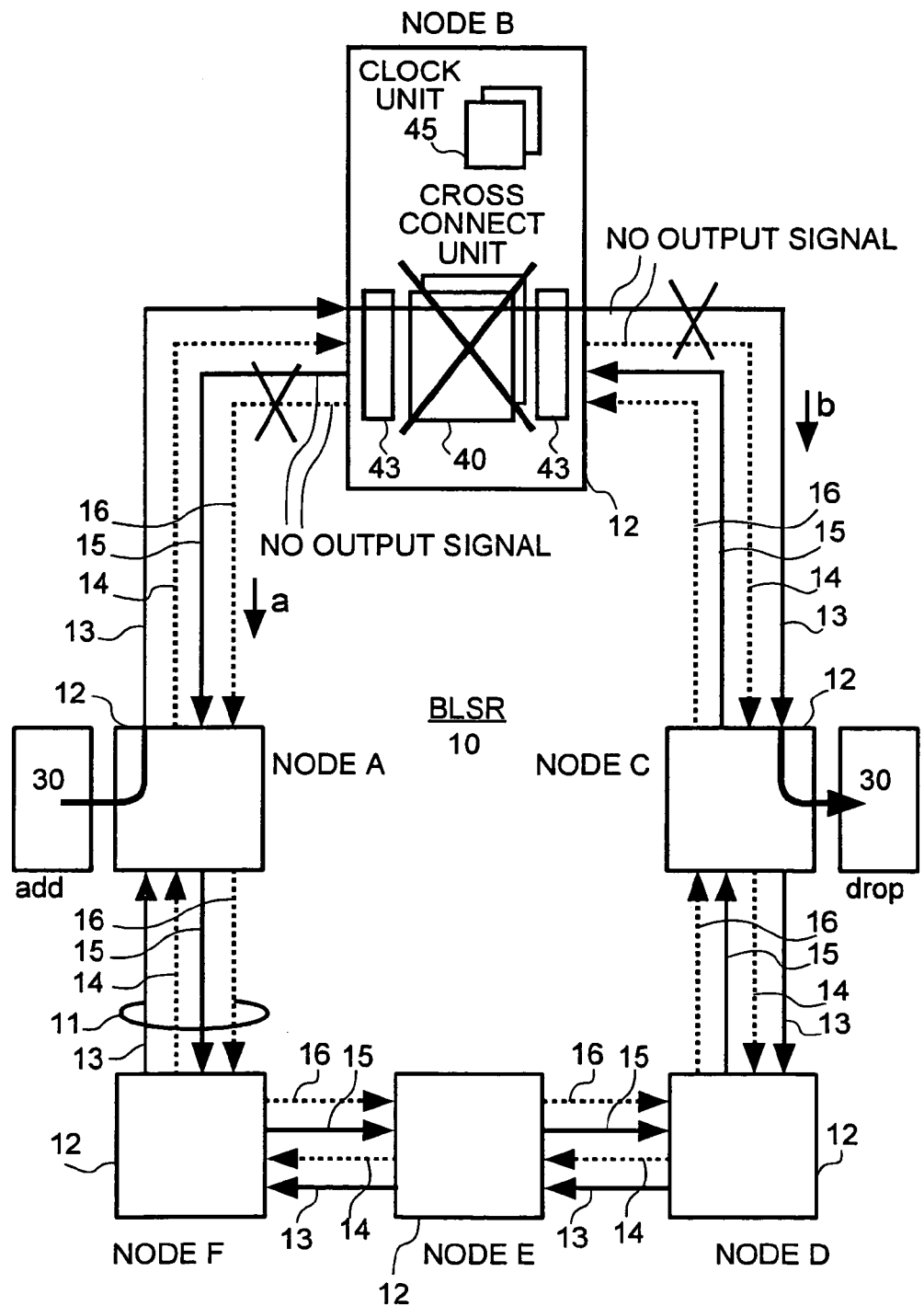
FIG. 8 shows a BLSR network indicating an output disconnection for a cross connect unit in which obstacles have occurred in more than one group in a particular embodiment according to the present invention.

FIG. 8 shows a representative transition of a BLSR network when its output is disconnected as in FIG. 7. In FIG. 8, four transmission lines that provide output from the node B are disconnected. Then, the node A and the node C detect obstacles on transmission lines and execute the switching operation. Consequently, on the BLSR network, ring switches are executed in the node A and the node C as in FIG. 6. For instance, paths set up as in FIG. 1 normally are protected by using a protection transmission line 16.

Figure 9:
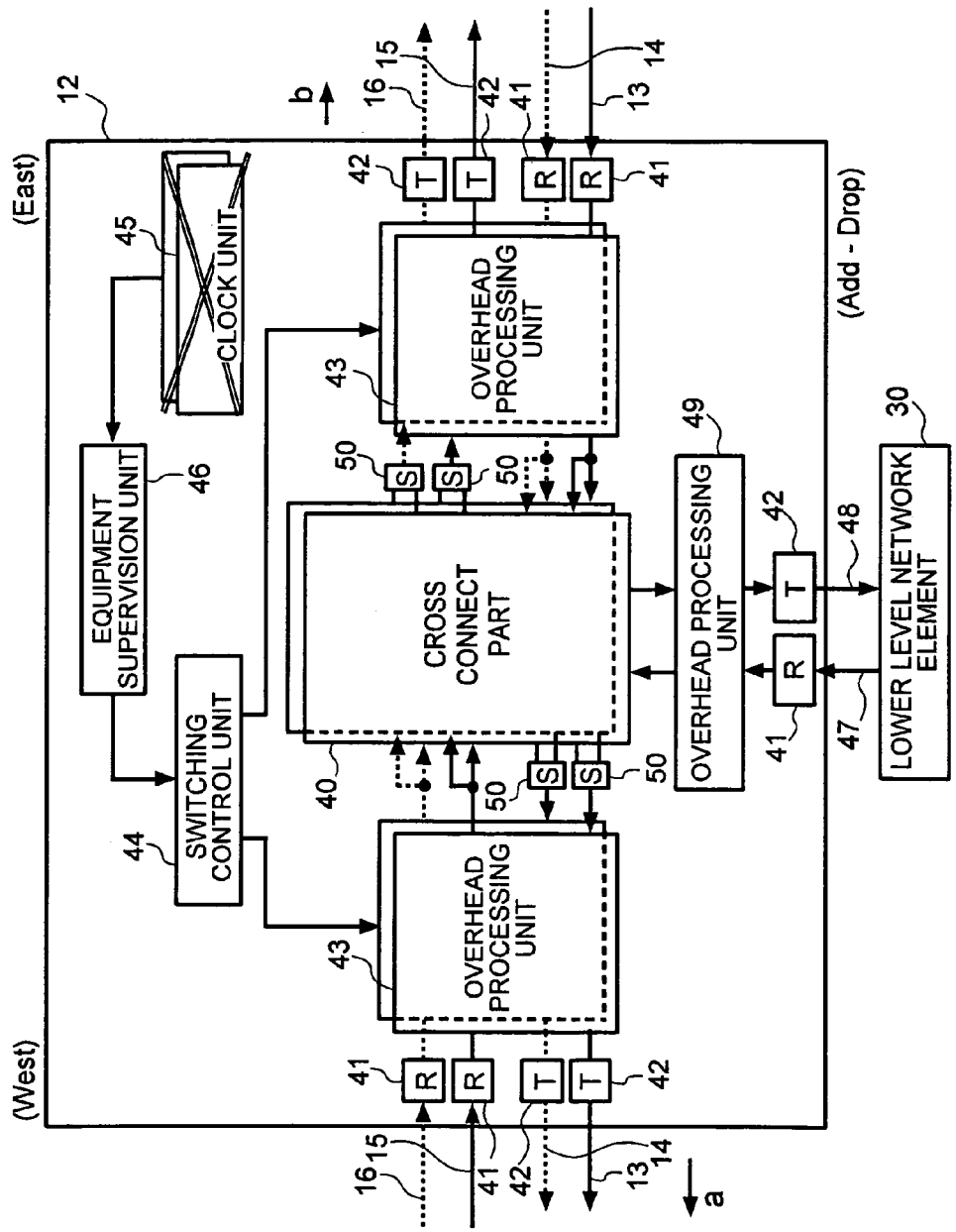
FIG. 9 shows a node executing an overhead processing for a clock unit in which obstacles have occurred in more than one group in a particular embodiment according to the present invention.

Further, FIG. 9 shows another embodiment of the present invention, in which a clock unit 45 suffers obstacles occurring in more than one group. When such a condition occurs in clock unit 45, normal clock signals to each functional unit within the node are interrupted, causing the paths to be disconnected. In a specific embodiment according to the present invention, the equipment supervision unit 46 instructs the switching control unit 44 to execute the node isolation to isolate the equipment, as in the case when both the working system and the protection system have obstacles in the cross connect unit 40. Further, the timing necessary for processing when the clock unit suffers obstacles occurring in more than one group is provided by a free-running clock.

In this case, the switching control unit 44 executes the switching operation and, as in FIG. 4, outputs K-bytes in FIG. 5 from the overhead processing unit 43. As a result, an adjacent node executes a ring switch in order to isolate the node of interest.

Figure 10:
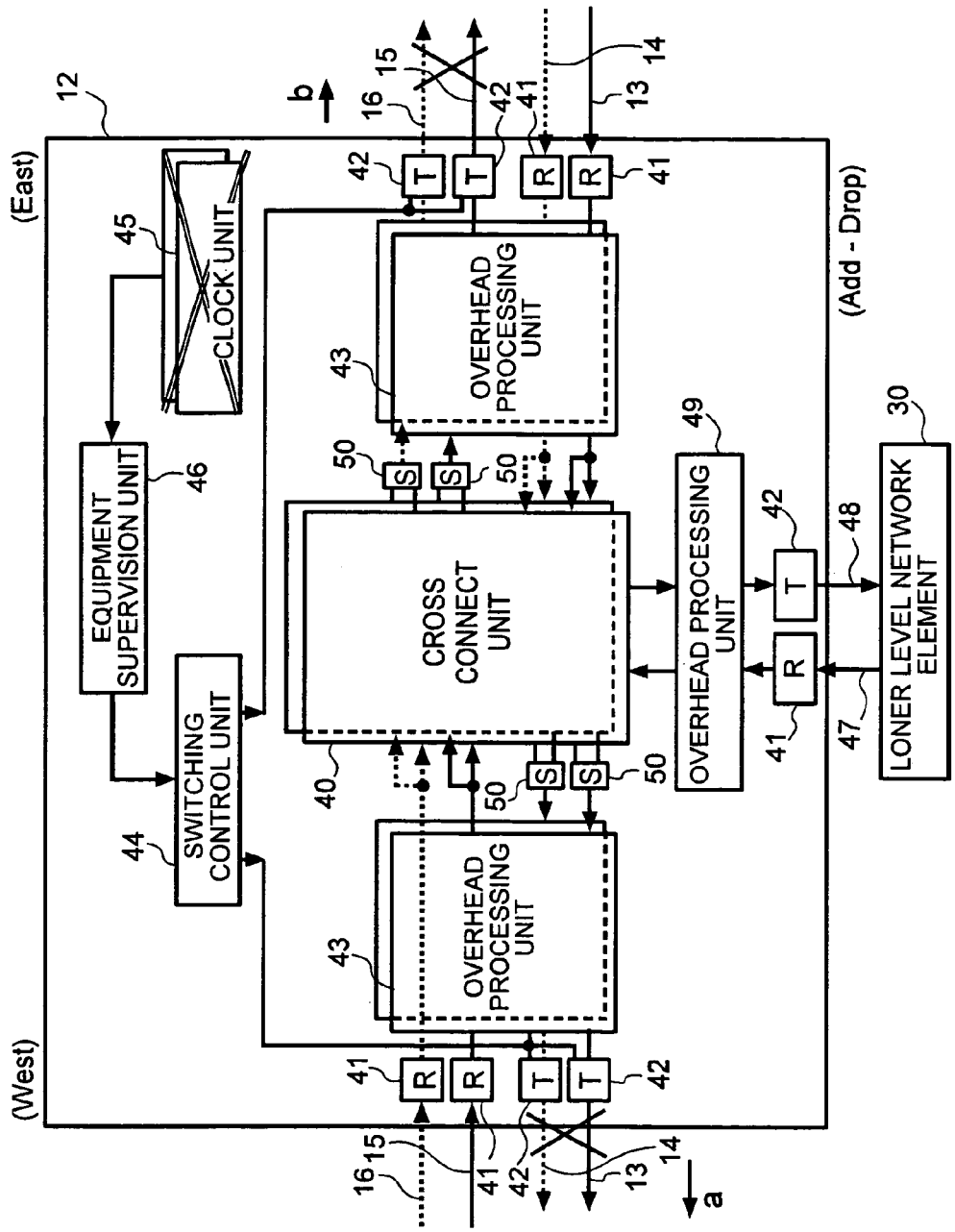
FIG. 10 shows a node disconnecting an output for a clock unit in which obstacles have occurred in more than one group in a particular embodiment according to the present invention.

FIG. 10 illustrates disconnecting four output transmission lines responsive to obstacles occurring in more than one group in the clock unit 45 in a particular embodiment according to the present invention. Such processing is analogous to the disconnection of output transmission lines in the case where the cross connect unit 40 suffers obstacles occurring in more than one group. By disconnecting four output transmission lines, as shown in FIG. 10, the node having a failure can be isolated. The switching operations of the BLSR network in FIGS. 9 and 10 relieve paths provided through the node B in a substantially similar manner as described relative to FIG. 6.

Figure 11:
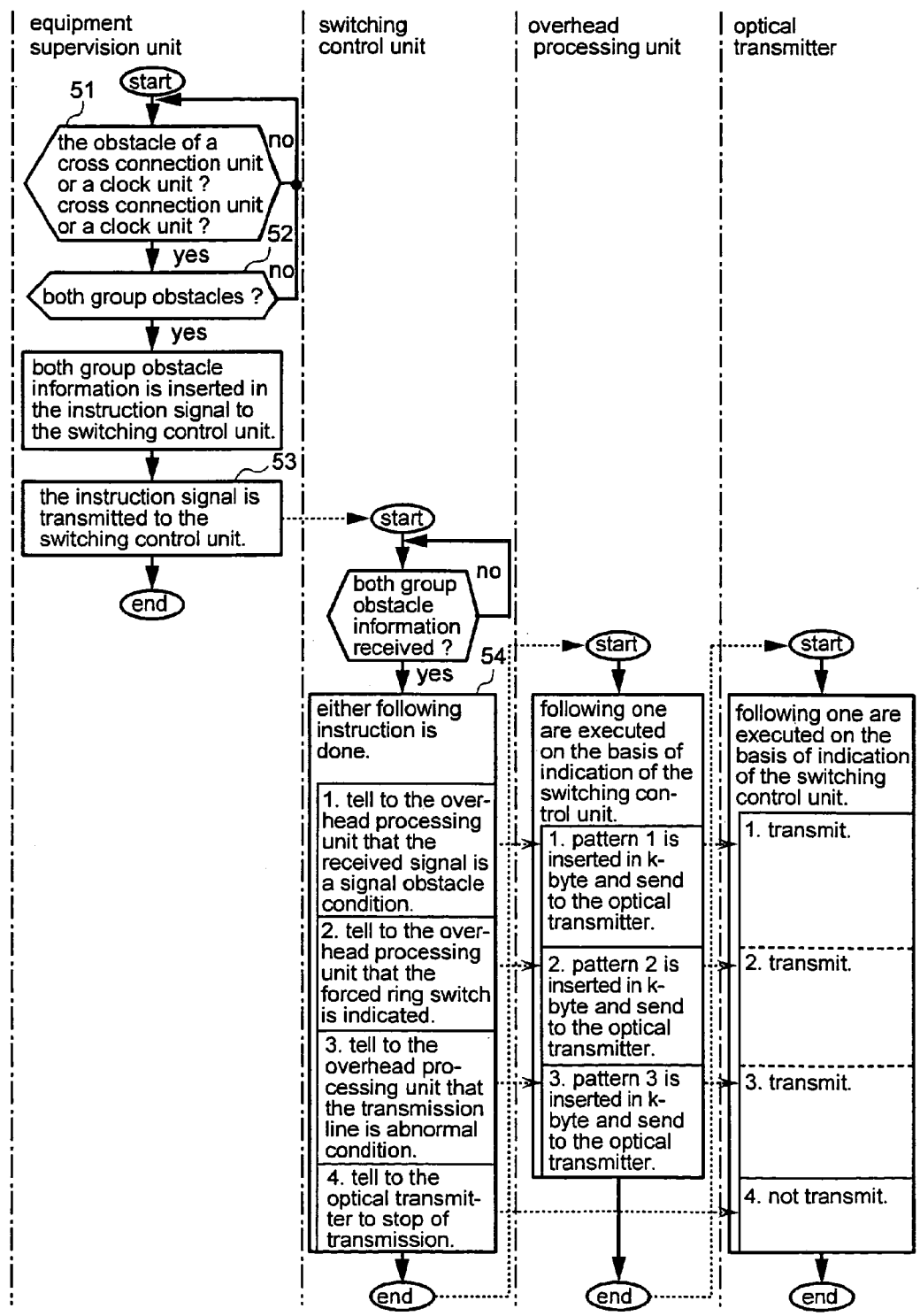
FIG. 11 shows a flowchart illustrating a processing in a particular embodiment according to the present invention.

FIG. 11 shows a flowchart of representative isolation instructions according to the present invention. FIG. 11 illustrates a step 51, in which the equipment supervision unit 46 determines whether an obstacle has occurred either in the cross connect unit or in the clock unit. If an obstacle does exist in either in the cross connect unit or in the clock unit, then in a step 52, whether the obstacle has occurred in more than one group is determined. If obstacles have occurred in more than one group, then in a step 53A, equipment supervision unit 46 instructs the switching control unit 44 to execute a node isolation operation. Specifically, information about a condition in which obstacles have occurred in more than one group in equipment detected by the equipment supervision unit 46 is inserted in the instruction signal to the switching control unit 44. Then, in a step 53B, the instruction signal is transmitted to the switching control unit 44. Further, when the information about the obstacles in the equipment inserted into the instruction signal, the information may remain in bit information format, or may be converted to other formats.

In various specific embodiments, the instructed switching control unit 44 and the overhead processing unit 43 can perform any one of the following operations responsive to the instructions received by equipment supervision unit 46 in step 53B.

As illustrated by a step 54.1, the switching control unit 44 can tell the overhead processing unit 43 that the condition is the same as in the case when SF failures are detected in all four input transmission lines. Responsive thereto, in a step 55.1, the overhead processing unit 43 inserts K-bytes according to pattern 1 of FIG. 5 and sends these K-bytes to the optical transmitter 42. These K-bytes are according to pattern 1 of FIG. 5, as in the case when the SF failures are detected, for example. Further, these K-bytes can be similar to those used in a BLSR network such as the one in FIG. 4.

As illustrated by a step 54.2, the switching control unit 44 can tell the overhead processing unit 43 to execute the forced ring switch (FS-R) on both sides of the faulty node. Responsive thereto, the overhead processing unit 43 inserts K-bytes indicating a FS-R command and sends these K-bytes to the optical transmitter 42. These K-bytes are according to pattern 2 of FIG. 5. Further, these K-bytes can be similar to those used in a BLSR network such as the one in FIG. 4.

As illustrated by a step 54.3, the switching control unit 44 can tell the overhead processing unit 43 that all four output transmission lines are in a condition analogous to an abnormal transmission line (Line-AIS) condition. Responsive thereto, the overhead processing unit 43 inserts K-bytes indicating a Line-AIS condition and sends these K-bytes to the optical transmitter 42. These K-bytes are according to pattern 3 of FIG. 5. Further, these K-bytes can be similar to those used in a BLSR network such as the one in FIG. 4.

As illustrated by a step 54.4, the switching control unit 44 can tell the optical transmitter to stop transmission so that all the four outputted transmission lines are disconnected.

By performing one of the operations of steps 55.1, 55.2, 55.3, or 55.4, in a BLSR network having an automatic switching function, a path through a node in which obstacles have occurred in more than one group of a cross connect unit or a clock unit can be relieved. For example, in networks such as the BLSR network of FIG. 1, paths can be relieved as illustrated by FIG. 6 using techniques according to the present invention as described herein.

In a representative embodiment according to the present invention, any of the processing techniques of steps 55.1, 55.2, 55.3, or 55.4 may be provided for in advance of a node failure. Further, in some specific embodiments an optional switching between hard failure processing techniques or soft failure processing techniques, may be performed according to the purpose of the embodiment. Further, when comparatively soft failure processing techniques are desired, the choice should be made steps 55.1, 55.2, 55.3, though such processing may require more processing time. On the other hand, when comparatively hard failure processing techniques, such as of step 55.4, are chosen, the only operation performed is to give an instruction to disconnect an optical output of the optical transmitter. In this case, one technique for disconnecting the optical output, is to cut off the power supply to the optical transmitter, with the effect of allowing a reduction in current consumption can be expected. Second, if a transmission signal input to the optical transmitter is masked by an optical-emitting element driving circuit and the optical output is shut off, a recovery is relatively easier than if the technique of cutting off the power is used.

Further, in the above described embodiments, the 4-fiber BLSR was used merely as a representative example. However, the present invention is applicable to the 2-fiber BLSR, and other popular ring network technologies as well.

Figure 12:
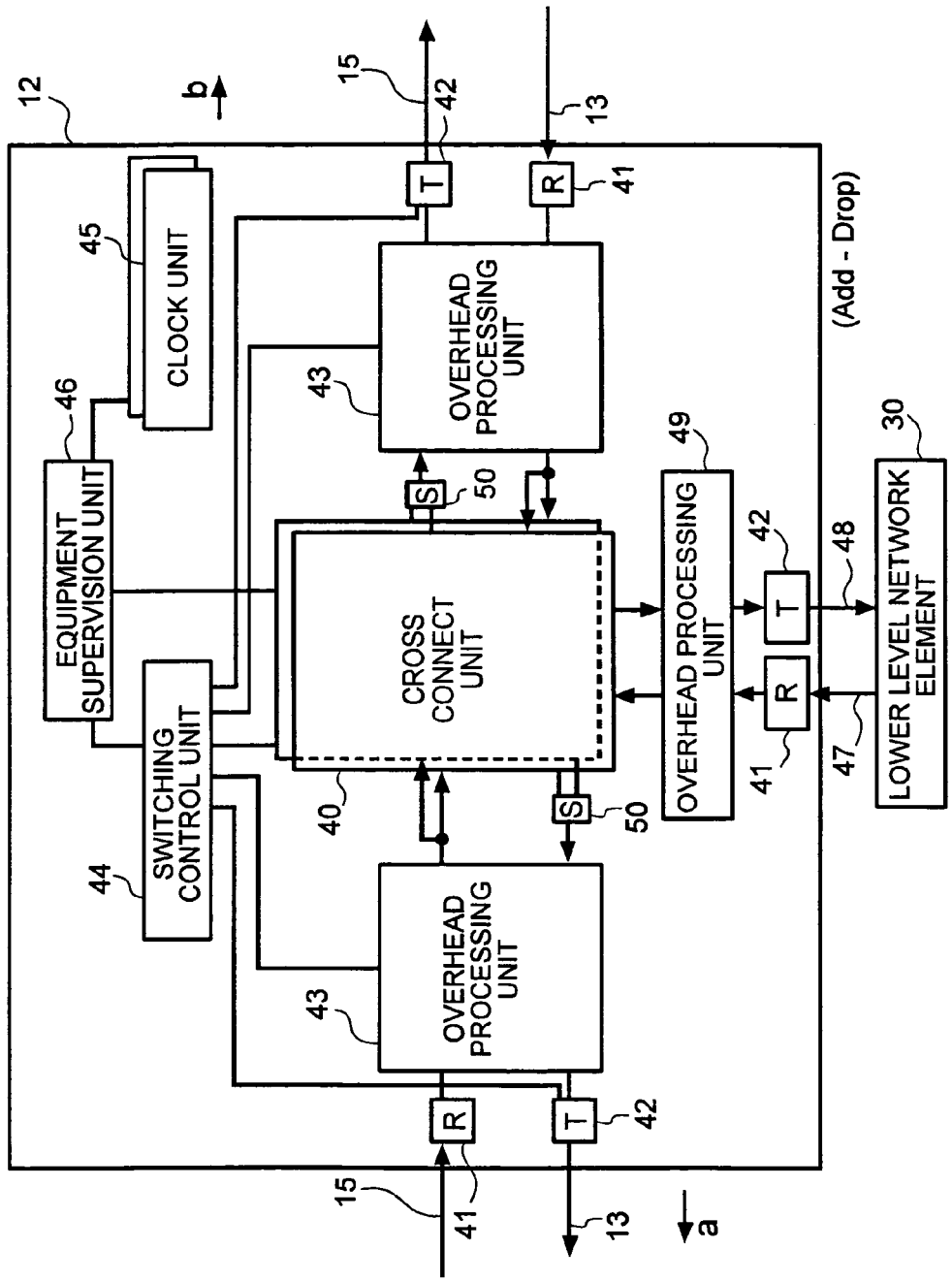
FIG. 12 shows the basic structure of a node of a particular embodiment according to the present invention having two fibers on one side.

FIG. 12 shows a representative node of a 2-fiber BLSR of the present invention.

Figure 13:
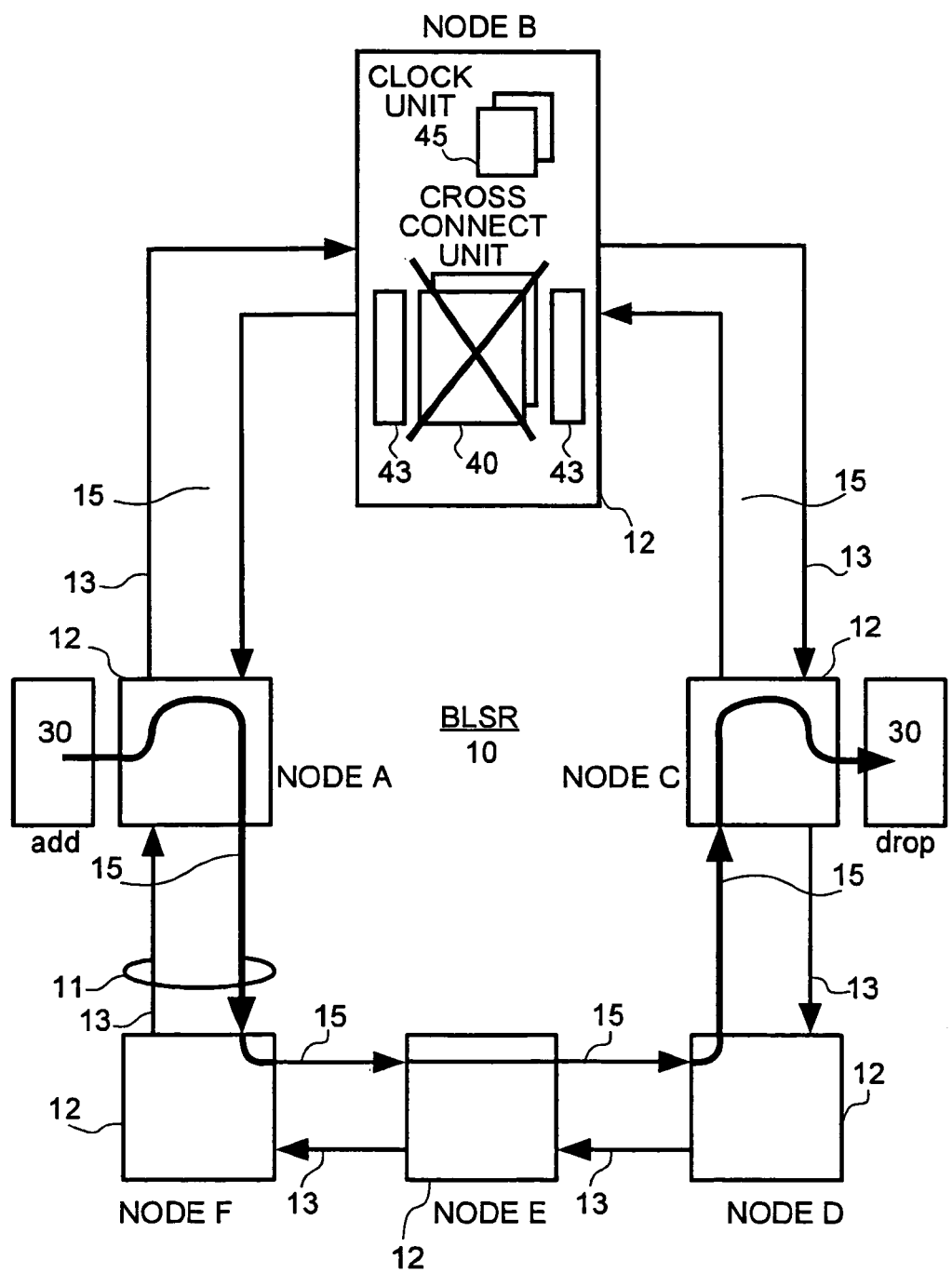
FIG. 13 shows a 2-fiber BLSR network having a cross connect unit in which obstacles have occurred in more than one group in a particular embodiment according to the present invention.

FIG. 13 shows a representative 2-fiber BLSR network in a particular embodiment according to the present invention. The configurations and operations in FIGS. 12 and 13 are relatively similar to those described above. One difference is that the capacity of each line is divided into two, and one half is used for the working system and a remaining half thereof is used for the protection system, thereby the capacity is reduced to the half in the cross connect unit.

The 2-fiber BLSR network has such a configuration that one half of the capacity is used for the working system and a remaining half thereof is used for the protection system. In various specific embodiments, the instructed switching control unit 44 and the overhead processing unit 43 can perform any one of the following operations responsive to the instructions received by equipment supervision unit 46 in step 53B as illustrated in FIG. 11.

As illustrated by a step 54.1, the switching control unit 44 can tell the overhead processing unit 43 that the condition is the same as in the case when SF failures are detected in the two input transmission lines. Responsive thereto, in a step 55.1, the overhead processing unit 43 inserts K-bytes according to pattern 1 of FIG. 5 and sends these K-bytes to the optical transmitter 42.

As illustrated by a step 54.2, the switching control unit 44 can tell the overhead processing unit 43 to execute the forced ring switch (FS-R) on both sides of the faulty node. Responsive thereto, the overhead processing unit 43 inserts K-bytes indicating a FS-R command and sends these K-bytes to the optical transmitter 42.

As illustrated by a step 54.3, the switching control unit 44 can tell the overhead processing unit 43 that both of the output transmission lines are in a condition analogous to an abnormal transmission line (Line-AIS) condition. Responsive thereto, the overhead processing unit 43 inserts K-bytes indicating a Line-AIS condition and sends these K-bytes to the optical transmitter 42.

As illustrated by a step 54.4, the switching control unit 44 can tell the optical transmitter to stop transmission so that both output transmission lines are disconnected.

In a representative embodiment according to the present invention, any of the processing techniques of steps 55.1, 55.2, 55.3, or 55.4 may be provided for in advance of a node failure. Further, in some specific embodiments an optional switching between hard failure processing techniques or soft failure processing techniques, may be performed according to the purpose of the embodiment.

According to the present invention, even when a path provided there through cannot be relieved, because of an obstacle in a cross connection unit or a clock unit in a BLSR network, the node isolation can be activated by operation of the present invention, and, as a result, the path provided there through can be relieved.

Although the above has generally described the present invention according to specific systems, the present invention has a much broader range of applicability. In particular, while foregoing has described a specific embodiments employing SONET, it holds true for SDH as well.

The specific embodiments described herein are intended to be merely illustrative and not limiting of the many embodiments, variations, modifications, and alternatives achievable by one of ordinary skill in the art. Further, the diagrams used herein are merely illustrations and should not limit the scope of the claims herein. One of ordinary skill in the art would recognize other variations, modifications, and alternatives. Thus, it is intended that the foregoing description be given the broadest possible construction and be limited only by the following claims.

What is claimed is:

1. A transmission apparatus for use in a communication network to which a plurality of transmission equipment are connected through a plurality of transmission lines transmitting synchronous multiplex signals, wherein overhead for supervision, maintenance and operations of transmission equipment and transmission lines is added to a payload in which main signals are multiplexed, said transmission apparatus comprising:

an optical transmitter that transmits said synchronous multiplex signals to said transmission lines, an optical receiver that receives said synchronous multiplex signals from said transmission lines, an overhead processing unit that adds said overhead to said payload and extracts said overhead out of said synchronous multiplex signals from said optical receiver, a cross connect unit that divides and multiplexes said payload inputted from said overhead processing unit, switches output routes of said payload for transmission to either of said transmission lines, and outputs to the overhead processing unit again, a clock unit that supplies a clock to at least said cross connect unit, an equipment supervision unit that supervises at least said cross connect unit and said clock unit and outputs an instruction signal based upon the result of the supervision, a switching control unit that controls switching of the transmission lines so that, being based upon said instruction signal and said overhead, said cross connect unit, said overhead processing unit and said optical transmitter, said synchronous multiplex signals may be transmitted to either of said transmission lines properly; and wherein upon said equipment supervising unit detecting a condition in which obstacles have occurred in more than one group in at least either of said cross connect unit and said clock unit, said equipment supervision unit inserts information about said obstacles in said instruction signal, and said switching control unit into which said instruction signal is inputted enables said overhead processing unit and the optical transmitter to output isolation instruction information to said transmission line.

2. A transmission apparatus according to claim 1, said transmission apparatus and an adjacent transmission equipment being interconnected by two optical fibers; wherein the capacity of each line is divided into two, one half thereof being used as a working line and the remaining half thereof being used as a protection line; and wherein, upon occurrence of said obstacle, said isolation instruction information further comprising said overhead indicating that said synchronous multiplex signals to be received are both in a signal obstacle condition.

3. A transmission apparatus according to claim 1, said transmission apparatus and an adjacent transmission equipment being interconnected by four optical fibers, each being used as a working line or a protection line; and wherein, upon occurrence of said obstacle, said isolation instruction information further comprising said overhead indicating that said synchronous multiplex signals to be received are both in a signal obstacle condition.

4. A transmission apparatus for a network according to claim 1, said transmission apparatus and an adjacent transmission equipment being interconnected by two optical fibers; wherein the capacity of each line is divided into two, one half thereof being used as a working line and the remaining half thereof being used as a protection line; and wherein, upon occurrence of said obstacle, said isolation instruction information further comprising said overhead for instructing a ring switch transmitting, upon reception, the received synchronous multiplex signals.

5. A transmission apparatus for a network according to claim 1, said transmission apparatus and an adjacent transmission equipment being interconnected by four optical fibers, each being used as a working line or a protection line; and wherein, upon occurrence of said obstacle, said isolation instruction information further comprising said overhead for instructing a ring switch transmitting, upon reception, the received synchronous multiplex signals.

6. A transmission apparatus for a network according to claim 1, said transmission apparatus and an adjacent transmission equipment being interconnected by two optical fibers; wherein the capacity of each line is divided into two, one half thereof being used as a working line and the remaining half thereof being used as a protection line; and wherein, upon occurrence of said obstacle, said isolation instruction information further comprising said overhead indicating that said synchronous multiplex signals to be transmitted are in a signal obstacle condition.

7. A transmission apparatus for a network according to claim 1, said transmission apparatus and an adjacent transmission equipment being interconnected by four optical fibers, each being used as a working line or a protection line; and wherein, upon occurrence of said obstacle, said isolation instruction information further comprising said overhead indicating that said synchronous multiplex signals to be transmitted are in a signal obstacle condition.

8. A transmission apparatus for a network according to claim 1, said transmission apparatus and an adjacent transmission equipment being interconnected by two optical fibers; wherein the capacity of each line is divided into two, one half thereof being used as a working line and the remaining half thereof being used as a protection line, or the transmission equipment are interconnected by four optical fibers, each being used as a working line or a protection line; and wherein, upon occurrence of said obstacle, said isolation instruction information further comprising a no-signal condition caused by stopping the transmission of said optical transmitter.

9. A transmission apparatus for a network according to claim 1, said transmission apparatus and an adjacent transmission equipment being interconnected by four optical fibers, each being used as a working line or a protection line; and wherein, upon occurrence of said obstacle, said isolation instruction information further comprising a no-signal condition caused by stopping the transmission of said optical transmitter.

10. A transmission apparatus for a network according to claim 1, wherein said transmission apparatus, upon occurrence of said obstacle, prepares as said isolation instruction any of the following:

said isolation instruction information is said overhead, wherein said overhead indicates that said received synchronous multiplex signals are both in signal obstacle conditions, said isolation instruction information is said overhead, wherein said overhead instructs a ring switch, in which synchronous multiplex signals are transmitted upon reception, said isolation instruction information is said overhead, wherein said overhead indicates that said synchronous multiplex signals to be transmitted are in a signal obstacle condition, and said isolation instruction information is a no output signal condition caused by stopping the transmission of said optical transmitter.

* * * * *